(12) United States Patent
Weninger et al.

(10) Patent No.: US 6,546,368 B1
(45) Date of Patent: Apr. 8, 2003

(54) SUBJECT IDENTIFICATION AID USING LOCATION

(75) Inventors: Thomas W. Weninger, Eagan, MN (US); Kevin James Warner, Brooklyn Park, MN (US); Nancy M. Seeman, Minnetonka, MN (US)

(73) Assignee: Identity Concepts, LLC, Eagen, MN (US)

( * ) Notice: Subject to any disclaimer, the term of this patent is extended or adjusted under 35 U.S.C. 154(b) by 103 days.

(21) Appl. No.: 09/620,267

(22) Filed: Jul. 19, 2000

(51) Int. Cl.[7] .............................................. G10L 21/00
(52) U.S. Cl. ................... 704/270; 704/246; 342/357.06
(58) Field of Search ................................. 704/246, 250, 704/270; 342/357.01–357.06; 701/211

(56) References Cited

U.S. PATENT DOCUMENTS

| | | | |
|---|---|---|---|
| 3,683,113 A | 8/1972 | Stewart | 704/258 |
| 4,730,284 A | 3/1988 | Adams | 368/72 |
| 5,059,126 A | 10/1991 | Kimball | 434/308 |
| 5,528,248 A * | 6/1996 | Steiner et al. | 342/357.06 |
| 5,555,664 A | 9/1996 | Shockley | 43/1 |
| 5,956,463 A * | 9/1999 | Patrick et al. | 704/246 |
| 6,085,148 A * | 7/2000 | Jamison et al. | 342/357.01 |
| 6,192,187 B1 * | 2/2001 | Kinghorn | 348/906 |
| 6,240,407 B1 * | 5/2001 | Chang et al. | 707/1 |

OTHER PUBLICATIONS

Good Catalog Company (Portland, Oregon), *Good Wholesale Catalog*, Winter 2000 Edition, p. 22.

* cited by examiner

*Primary Examiner*—David D. Knepper
(74) *Attorney, Agent, or Firm*—Crompton, Seager & Tufte

(57) ABSTRACT

A device includes a visual display and a memory for storing a plurality of subject record sets. The device may be used by a user to help identify a subject, and information related to the identified subject may be displayed on the visual display. In one embodiment of the present invention, the device includes a clock that determines the present time and a locator that determines the present location of the device. The subject record sets stored in the memory are evaluated to identify those subjects that are likely to be proximate the present location at the present time.

59 Claims, 10 Drawing Sheets

SUBJECT IDENTIFICATION AID USING LOCATION

FIELD OF THE INVENTION

The present invention relates generally to methods and apparatus for identifying a subject. More particularly, the present invention relates to methods and apparatus for aiding an observer in identifying a subject.

BACKGROUND OF THE INVENTION

Human beings are naturally inquisitive and curious. They tend to observe their surroundings and examine subjects of interest nearby. When a subject of particular interest is observed, the observer often desires to identify the subject and perhaps learn more about it. Examples of subjects that may capture the interest of a human observer include living beings and non-living objects. Examples of living beings include birds, other human beings, insects, fish, and mammals. Examples of non-living objects include vehicles, minerals, and rocks.

Bird watching is one popular activity that involves the identification of a living being. People who engage in bird watching range from amateur bird watchers to professional ornithologists. It has been estimated that there are about 63 million active bird watchers in the United States. It has also been estimated that nearly 25 million people in the United States travel away from home on at least one bird watching trip each year.

Besides sighting and identifying birds, one of the greatest pleasures of bird watching is keeping a log of all birds that have been seen and/or heard. Often a bird watcher writes down in a notebook the name of the sighted bird, the place it was seen, the date, and the time of day. Many bird watchers also keep a list of all the bird species that they have seen. This list is sometimes referred to as a life list since it reflects a lifetime of experience in bird watching.

The equipment carried on a bird watching expedition often includes a notebook and a fieldguide. A fieldguide is a book that includes descriptions of various birds meant to aid a bird watcher in identifying those birds. Referencing a fieldguide and taking notes in a notebook are activities that typically require the use of the bird watchers hands and eyes. When referring to a fieldguide, the bird watcher must stop looking at the bird of interest and direct his or her eyes at the fieldguide. When taking notes in a notebook, the bird watcher typically has the notebook in one hand, a pen in the other hand, and eyes focused on the notebook. It is an unfortunate fact that these important activities actually reduce the amount of time that the bird watcher is able to watch birds.

SUMMARY OF THE INVENTION

The present invention overcomes many of the limitations of the prior art by providing a device for aiding a user in identifying a subject, such as a bird. A device in accordance with the present invention preferably includes a visual display and a memory for storing a plurality of subject record sets. Each subject record set preferably includes information describing a subject. The device may be used to identify the observed subject. Information relating to the identified subject may also be displayed on the visual display for reference.

In one illustrative embodiment, the device includes a clock for determining the present time, and a position locator for determining the present location of the device. Using the time and location, the device can evaluate the subject record sets stored in the memory and identify those subjects that are likely to be proximate the present location at the present time. If more than one subject is identified, the user of the device may select one of the identified subjects, and information related to the selected subject may be displayed on the visual display.

In addition, it is contemplated that each subject record set may include a corresponding characteristic sound for each of the corresponding subjects. To help identify a subject in the field, the user may play the characteristic sound of a selected subject. By listening to the sound of the subject, and the characteristic sound produced by the device, the user may be able to identify the subject. A sound sensor such as a microphone may also be used to sense a sample sound from the subject. A processor may then compare the sample sound to the characteristic sound records stored in the memory of the device, preferably using standard FFT (fast Fourier transform) methods. The subjects having a characteristic sound that matches the sample sound may be automatically selected and displayed on the visual display. If more than one subject is identified, a user may select one of the displayed subjects, and information related to the selected subject may be displayed on the visual display. The characteristic sound of the selected subject may also be played.

After a user has identified a bird, a record of the event may be electronically stored in the memory of the device. For example, once a desired subject has been identified, the user may provide a journal entry to the electronic device by, for example, depressing one or more keys. Once the journal entry is made, a button may be depressed, causing the electronic device to electronically store the journal entry. The device may also store information relating to the selected subject along with the present location and he present time.

DETAILED DESCRIPTION OF THE INVENTION

The following detailed description should be read with reference to the drawings, in which like elements in different drawings are numbered in like fashion. The drawings, which are not necessarily to scale, depict selected embodiments and are not intended to limit the scope of the invention. In some cases, the drawings may be highly diagrammatic in nature. Examples of constructions, materials, dimensions, and manufacturing processes are provided for various elements. Those skilled in the art will recognize that many of the examples provided have suitable alternatives which may be utilized.

Figure 1:
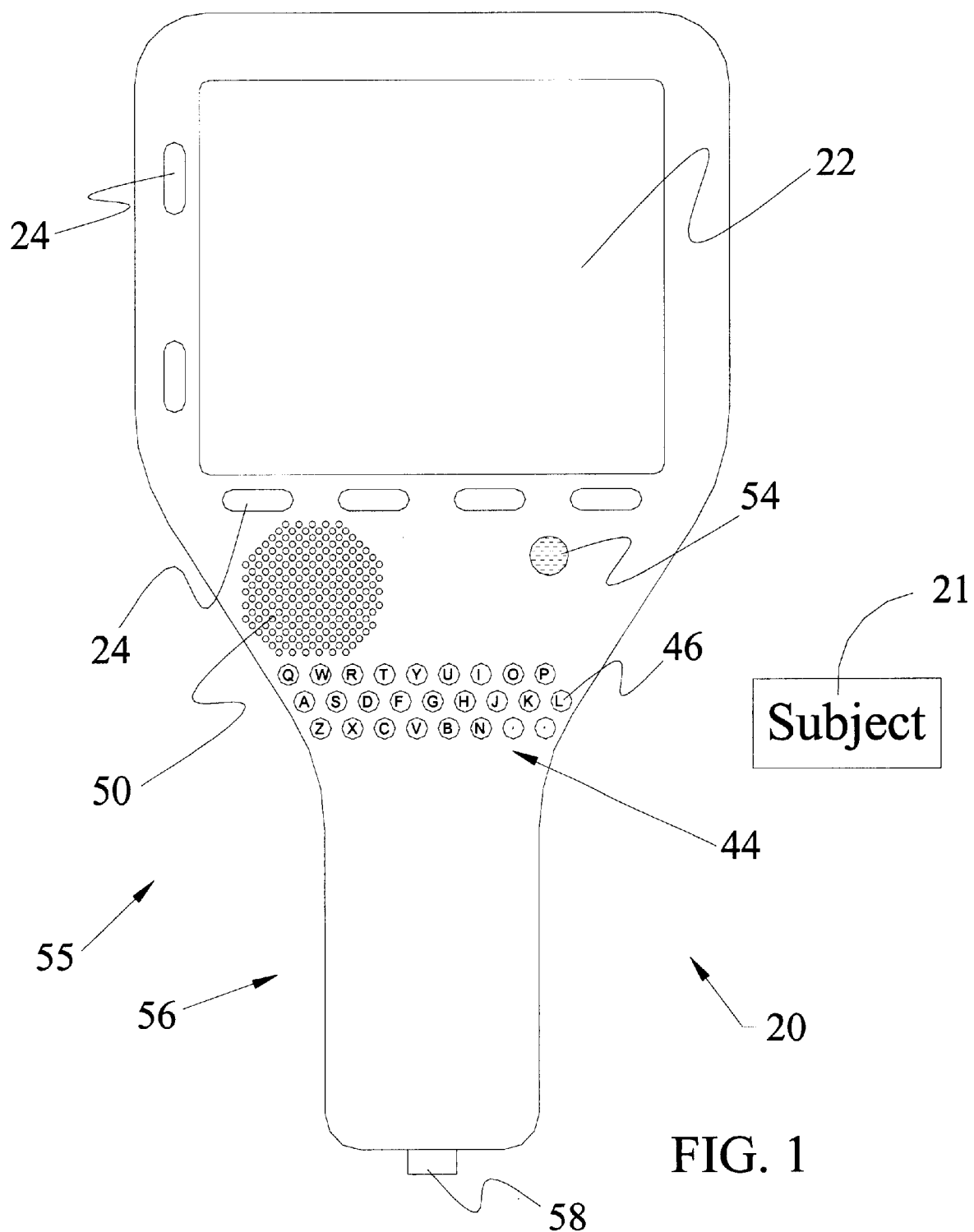
FIG. 1 is a plan view of an exemplary embodiment of an electronic device in accordance with an illustrative embodiment of the present invention.

FIG. 1 is a plan view of an illustrative embodiment of an electronic device 20 in accordance with the present invention. The electronic device 20 is used by a user to identify a subject 21. In the description which follows, the present invention will be explained using the exemplary task of identifying a bird. However, it is contemplated that the electronic device 20 may be used to identify subjects other than birds without deviating from the spirit and scope of the present invention. Examples of subjects 21 include living beings and non-living objects. Examples of living beings include birds, human beings, (e.g., sports figures with associated scoring statistics, injuries, etc.) insects, reptiles, fish, amphibians, trees, and mammals. Examples of non-living objects include vehicles, minerals, rocks, buildings, bridges, landmarks, lighthouses, works of art, and knitting loops. Examples of vehicles include automobiles, airplanes, trains, boats, ships, and motorcycles.

The electronic device 20 includes a visual display 22 and a plurality of the buttons 24. Visual display 22 preferably includes an anti-glare color liquid crystal display (LCD). Visual display 22 is also preferably illuminated for use in low light conditions (e.g., night time). Command titles may be displayed on the visual display 22 proximate one or more of the buttons 24. By depressing the button corresponding to the command title, the user may execute a command. Embodiments of the present invention have been envisioned in which a plurality of command titles are displayed the visual display 22 whenever electronic device 20 is being used. Examples of possible command titles include "RANGE MAPS", "ILLUSTRATIONS", "TEXT", "JOURNAL", AND "SONG". Although the previous examples are in the English language, it is to be appreciated that command titles and other information stored in electronic device 20 may be in any language. It should also be appreciated that this information may be in multiple languages.

In a preferred embodiment, the visual display 22 is adapted to display various items stored in a memory 26 (see FIG. 4) of the electronic device 20. For example, a list of subjects or classes of subjects may be displayed on the visual display 22. The buttons 24 may be used to select one of the subjects or classes of subjects listed on the visual display 22. Once a subject has been selected, a pictorial representation of the selected subject may be displayed on the visual display 22. In a preferred embodiment, a plurality of subject record sets are stored in memory 26 of the electronic device 20 with each record set corresponding to one subject.

Figure 2:
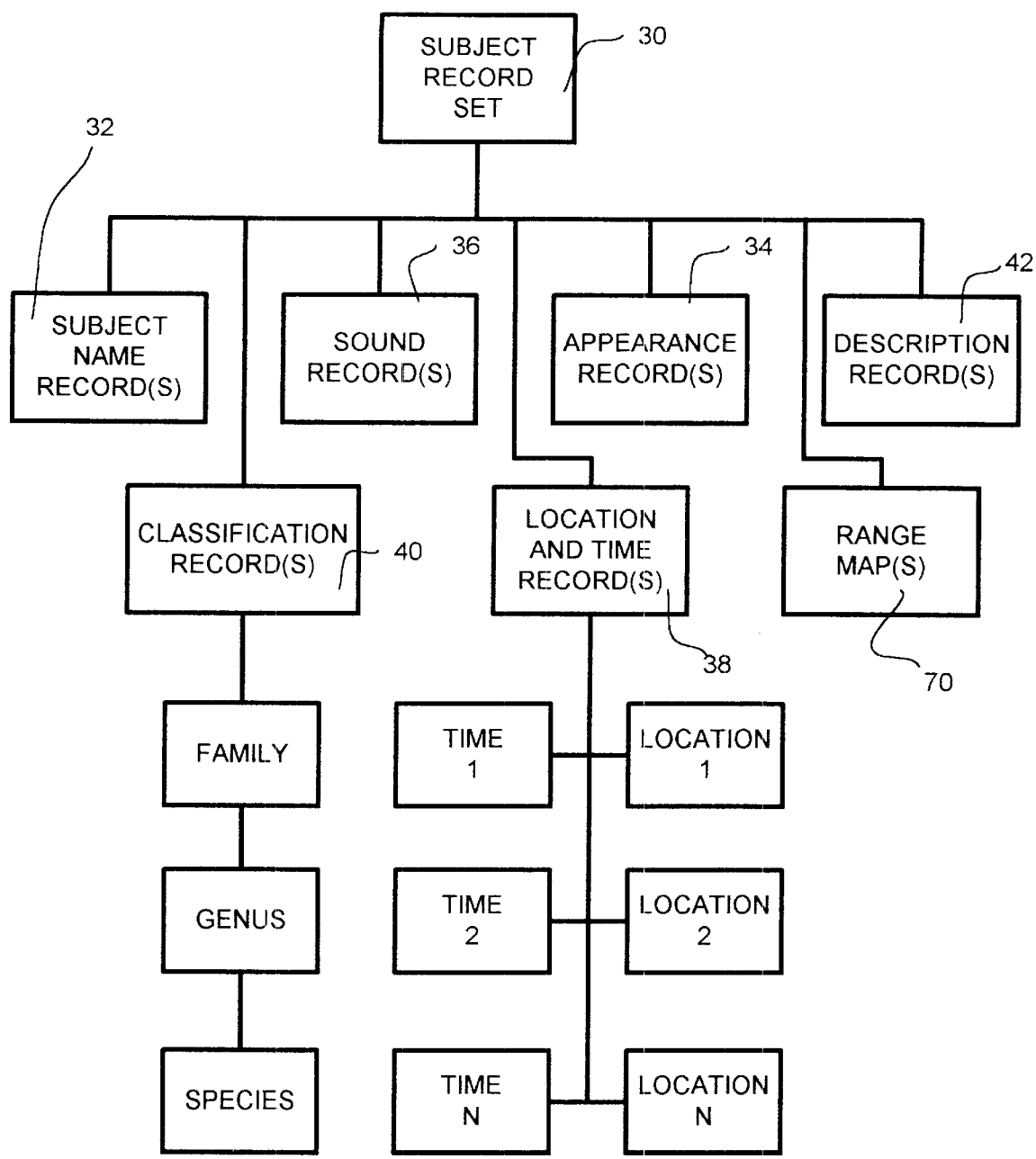
FIG. 2 is a block diagram of a subject record set in accordance with an illustrative embodiment of the present invention.

FIG. 2 is a block diagram of an illustrative subject record set 30, including a name record 32 that may include text corresponding to the name of the subject of the illustrative subject record set 30. The illustrative subject record set 30 may also include an appearance record 34, which may include digital data corresponding to a pictorial representation of the subject of the illustrative subject record set 30. The illustrative subject record set 30 also may include a sound record 36, which may include digital data corresponding to a characteristic sound likely to be produced by the subject of the illustrative subject record set 30.

The illustrative subject record set 30 of FIG. 2 may also include a time and location record 38, which may include one or more time parameters and one or more location parameters. Each location parameter may define a region, and any global positioning system (GPS) coordinates which fall within the region may be deemed to be at the location. Each time parameter is preferably paired with a location parameter for describing a period of time when the subject is likely to be proximate the location described by the location parameter. In a preferred embodiment, the electronic device 20 may be used to evaluate the subject record sets in memory 26 and identify those subjects that are likely to be proximate a particular location.

The illustrative subject record set 30 of FIG. 2 may also include a classification record 40. The classification record 40 may be used to identify which class(es) a subject is a member. For example, birds are often classified using a plurality of taxonomic categories. Examples of taxonomic categories include the family, the genus, and the species. A species is made up of a group of birds that are capable of interbreeding. A genus includes a group of species that have many similarities. A family includes of a group of genera that have some similarities, but which are not capable of interbreeding.

In one illustrative method of the present invention, a user may select a class of interest using one of the buttons 24. The electronic device 20 may then evaluate the subject record sets in memory 26 and identify those subjects that are members of the class of interest. A listing of the subjects in the class of interest may be displayed on the visual display 22 of FIG. 1.

The illustrative subject record set 30 of FIG. 2 may also include a description record 42. Description record 42 may include a written description of the subject. For example, the description may include the field marks associated with a particular species of bird. Field marks are characteristics that are readily observable, and thus can be used to identify the species of a bird.

Figure 3:
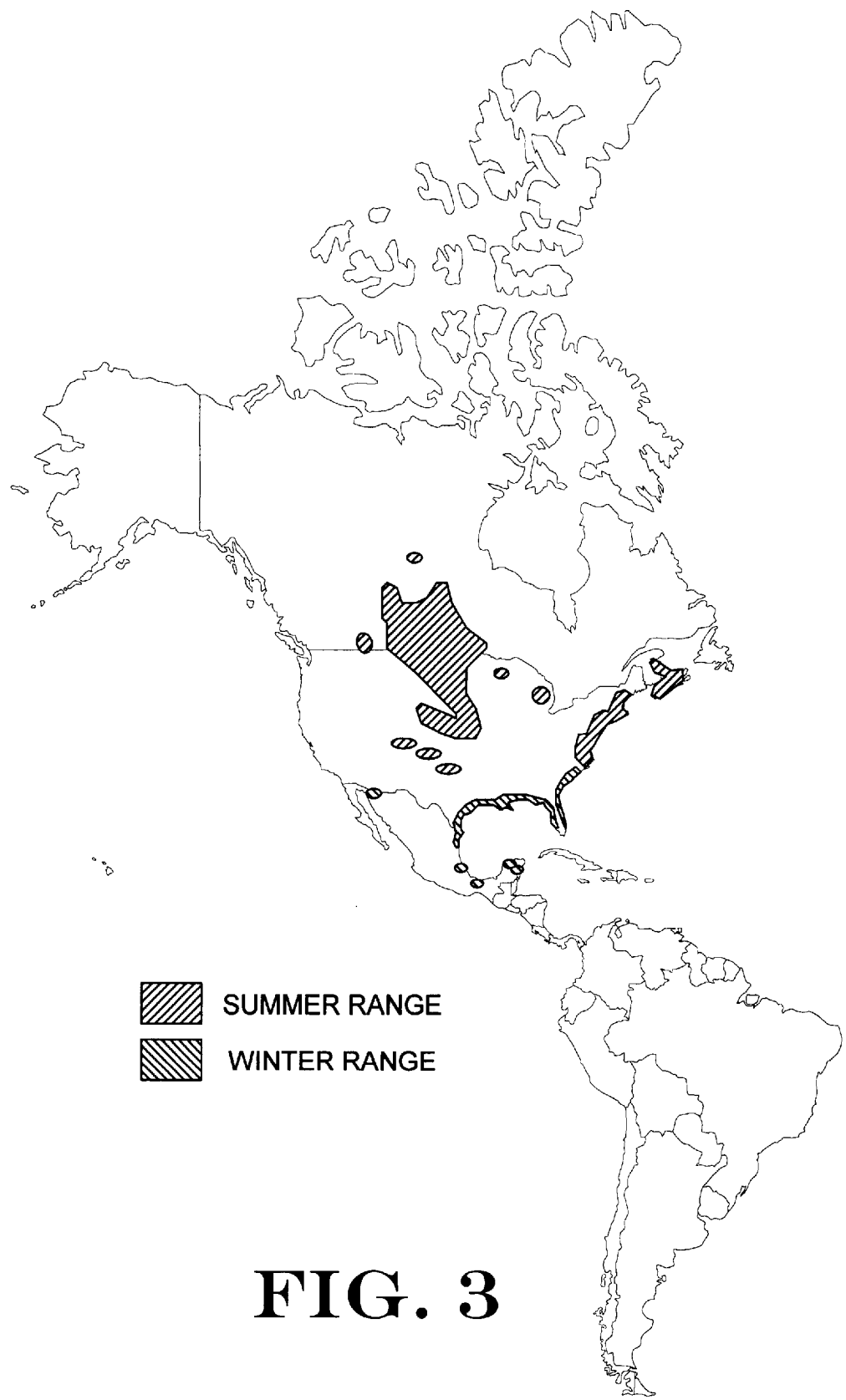
FIG. 3 is an exemplary range map.

The illustrative subject record set 30 of FIG. 2 may also include one or more range maps 70. The range maps 70 preferably illustrate geographical areas in which a subject is likely to be found during different times of the year. Range maps may also identify other information such as the principle direction of migration, the extent of irregular breeding range etc. FIG. 3 is an exemplary range map for a bird named the Piping Plover.

It will be appreciated that illustrative subject record set 30 may include various other information without deviating from the spirit and scope of the present invention. For example, if the subject is a bird, the bird may have a number of songs or calls that are vocalized on different occasions. When this is the case, the illustrative subject record set 30 may include a plurality of sound records 36, each corresponding to a different characteristic birdsong or birdcall. By way of a second example, male birds and female birds of a single bird species may be substantially different in appearance. When this is the case, the illustrative subject record set 30 may include a plurality of appearance records. In yet another example, a bird may be referred to by more than one name (e.g., a common name and a scientific name). When this is the case, the illustrative subject record set 30 may include more than one name record.

Referring again to FIG. 1, it is contemplated that the electronic device 20 may also include a keypad 44 having keys 46. In a preferred embodiment, the keys 46 are used to enter a journal entry into memory 26 (illustrated in FIG. 4) of the electronic device 20. The journal entry may be displayed on the visual display 22 while it is being entered.

The electronic device 20 may also include a speaker 50 that can be used to produce sounds. As shown in FIG. 2, the illustrative subject record set 30 may include one or more sound records 36 for each subject. Each sound record 36 may include digital data corresponding to a characteristic sound likely to be produced by the subject described by a subject record set. The speaker 50 of electronic device 20 may then be used to produce a sound corresponding to the sound record 36 of a subject record set stored in the memory 26.

Speaker 50 may also provide audible prompts to the user of electronic device 20. For example, speaker 50 may provide an audible description of a subject, thereby allowing the user to keep his or her eyes on the subject. By way of a second example, speaker 50 may provide a series of audible instructions, which help teach the user how to use the device or function. By way of a third example, speaker 50 may provide an audible "reading" of the text appearing on the visual display.

Electronic device 20 of FIG. 1 also includes a volume control 72 and a jack 74. The volume control 72 may be utilized to adjust the volume of the sound produced by speaker 50. Jack 74 may be utilized to couple a second device (e.g., headphones, ear phone, recording device, etc.) to electronic device 20.

The electronic device 20 may also include a sound sensor 54. Examples of sound sensors which may be suitable in some applications include a microphone, such as a directional microphone, or a laser microphone. The sound sensor 54 may be used to record and/or analyze sounds produced by subjects in the field. For example, the sound sensor 54 may be used to sense a sample sound originating from a subject that the user would like to identify. If the user is attempting to identify a bird, the sound sensor may sense a birdsong originating from the bird. The sensed sample sound may be digitized and stored in memory 26. The electronic device 20 may then identify a sound record in the memory 26 that is similar to the sample sound detected by the sound sensor 54. Filters may be used to filter out the ambient noise from the sample sound to help isolate the sound originating from the subject of interest.

The electronic device 20 may also include a chassis 55 having a handle portion 56 that is preferably sized to fit in one hand of a user. Chassis 55 is preferably formed of a thermoplastic material which is resistant to insect repellants. Chassis 55 also preferably includes a rubber bumper disposed about it's periphery.

An interface port 58 may be disposed proximate the distal end of the handle portion 56. The interface port 58 may allow the electronic device 20 to exchange information with other electronic devices such as, for example, a personal computer. For example, information describing additional subjects may be uploaded into memory 26 via interface port 58. Alternatively or in addition, journal entries stored in memory 26 may be downloaded to a personal computer. An application program running on the personal computer may then be used to view the journal entries, edit the journal entries, display the sightings on a map, etc.

Figure 4:
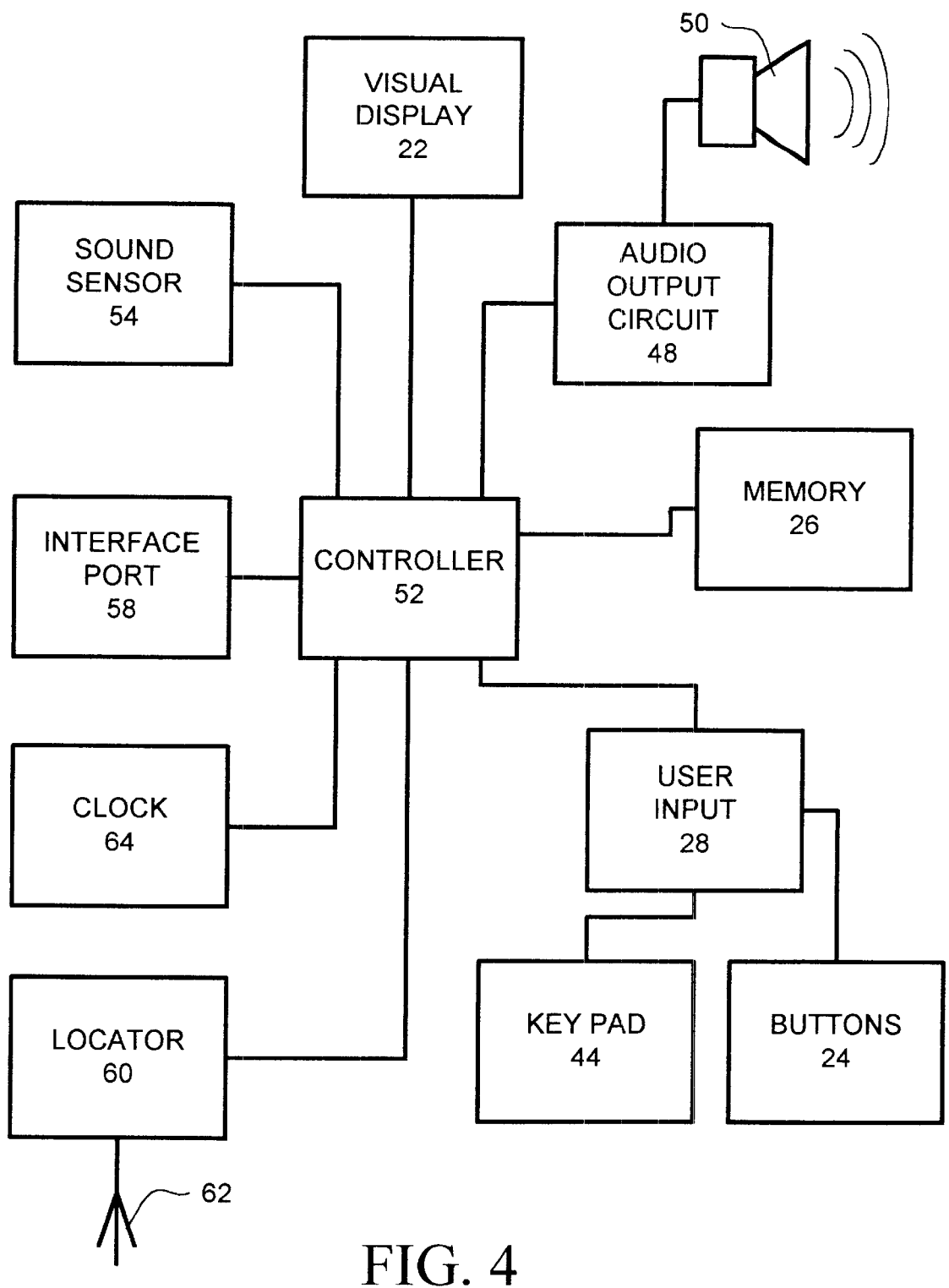
FIG. 4 is a block diagram of the electronic device of FIG. 1.

FIG. 4 is a block diagram of the illustrative electronic device 20 of FIG. 1. In the illustrative embodiment, the electronic device 20 includes a controller 52, a memory 26, a user input block 28, a locator 60, a clock 64, a visual display 22, a sound sensor 54, an audio output circuit 48, and an interface port 58. The controller 52 is coupled to memory 26, which stores a plurality of subject record sets each describing a subject. The controller 52 is preferably a microprocessor. Memory 26 is preferably a combination of solid state memory chips (e.g., DRAM's) and a hard drive. However, memory 26 may include any data storage device including, for example, a floppy disk, a compact disk, a DVD drive, etc.

As shown in FIG. 4, the controller 52 is also coupled to a locator 60, which is preferably adapted to determine a present location of the electronic device 20. The locator 60 may be a global positioning system (GPS). GPS chip sets are commercially available from Motorola of Phoenix, Ariz.; Philips Semiconductor of Sunnyvale, Calif.; Rockwell Semiconductor of Newport Beach, Calif.; SGS-Thompson of Lincoln, Mass.; SiRF Technology of Sunnyvale, Calif.; GEC Plessey of Scotts Valley, Calif.; and others. In the embodiment of FIG. 4, the locator 60 is coupled to an antenna 62. Once the locator 60 identifies the present location, the controller 52 may evaluate the subject record sets stored in memory 26 to identify those subjects that are likely to be proximate the present location.

The electronic device 20 may also include a clock 64 coupled to the controller 52. The clock 64 may be used to determine the present time of day and the present time of year. As described above, each subject record set stored in memory 26 may include one or more time parameters, each time parameter being preferably paired with a location parameter. In one illustrative method of the present invention, the controller 52 is used to evaluate the subject record sets stored in memory 26 and identify those subjects that are likely to be proximate the present location at the present time. This may be particularly relevant to bird watchers, as some birds migrate to different locations during different seasons.

The electronic device 20 may also include an audio output circuit 48 that is coupled to speaker 50 and controller 52. The audio output circuit 48 generates an audio signal that causes the speaker 50 to produce a sound corresponding to a sound record 36 of a subject record set stored in the memory 26.

Electronic device 20 may also include a user input block 28 that is coupled to controller 52. In the embodiment shown in FIG. 4, user input block 28 is coupled to a key pad 44 and buttons 24. It is contemplated that the user input block 28 may be coupled to other input devices without deviating from the spirit and scope of the present invention. Examples of other input devices include a track ball, a mouse, a touch sensitive screen, a stylus, etc. The visual display 22, the sound sensor 54, and the interface port 58 may also be coupled to controller 52.

Figure 5:
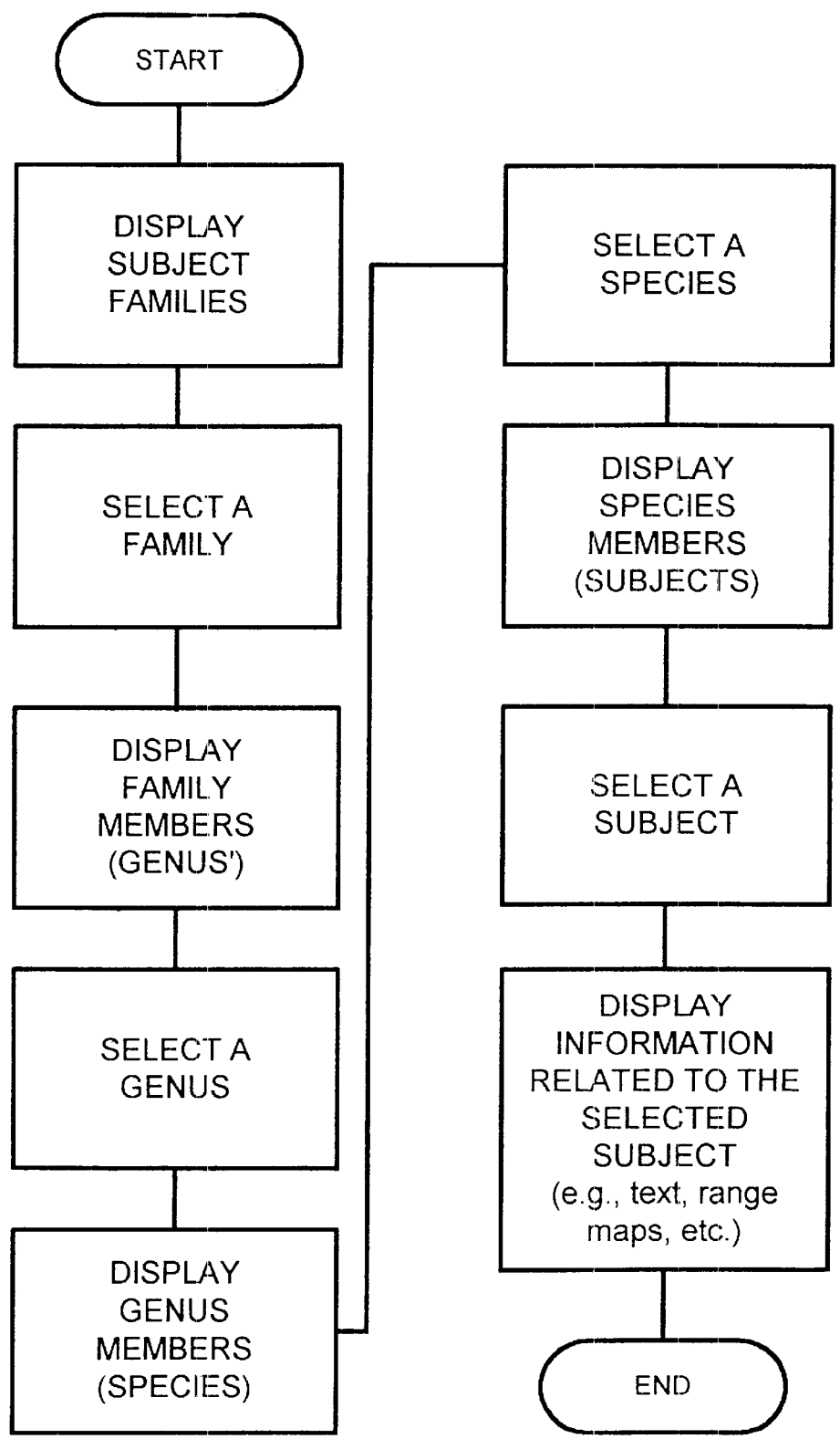
FIG. 5 is a flow chart showing an illustrative method for identifying a subject in accordance with the present invention.

FIG. 5 is a flow chart showing an illustrative method for identifying a subject in accordance with the present invention. In the method shown in FIG. 5, a plurality of families are first displayed, preferably on the visual display 22. The user may select a family by, for example, depressing one or more of the buttons 24 of FIG. 1. A number of genera which include the selected family may then be displayed, and the user may select a genus. The species that make up the selected genus may then be displayed, and the user may select a species. The subjects that are members of the selected species may then be displayed and the user may select a subject from those that are displayed. Information pertaining to the selected subject may then be displayed, such as one or more of the records of the subject record set stored in memory 26.

Figure 6:
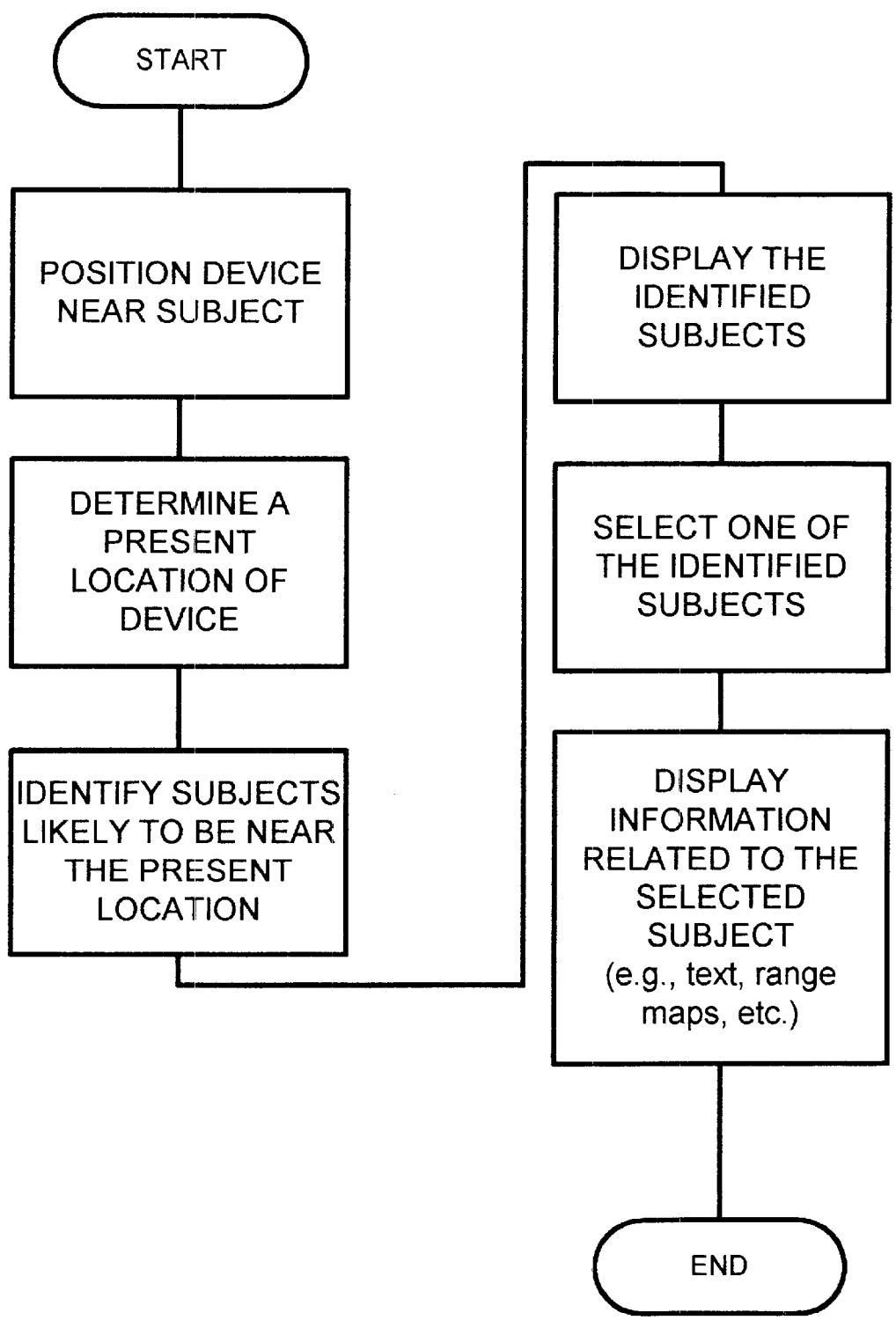
FIG. 6 is a flow chart showing another illustrative method for identifying a subject in accordance with the present invention.

FIG. 6 is a flow chart illustrating another illustrative method for identifying a subject in accordance with the present invention. The method of FIG. 6 begins with the step of positioning the electronic device 20 near the location of the subject to be identified. The locator 60 (see FIG. 4) of the device 20 may then be used to determine the present location of the device. The controller 52 of the electronic device 20 may then evaluate the subject record sets contained in memory 26 and identify those subjects that are likely to be proximate the present location. After identifying those subjects that are likely to be proximate the present location, the controller 52 may display the identified subjects on the visual display 22. The user preferably then uses one or more of the buttons 24 to select one of the identified subjects. Information regarding the selected subject is then be displayed on the visual display 22.

Figure 7:
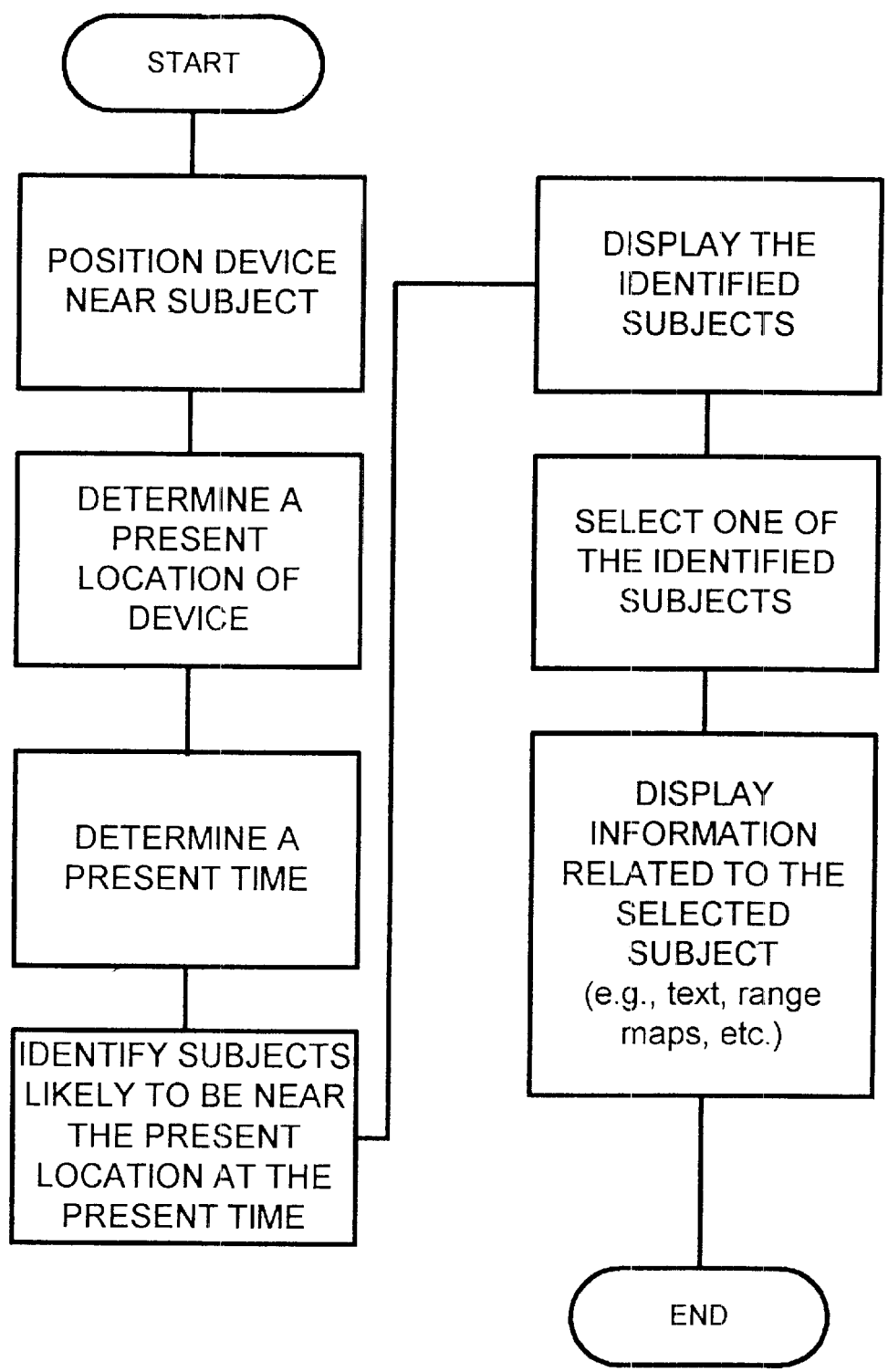
FIG. 7 is a flow chart showing yet another illustrative method for identifying a subject in accordance with the present invention.

FIG. 7 is a flow chart showing yet another illustrative method for identifying a subject in accordance with the present invention. In the method of FIG. 7, the clock 64 of the electronic device 20 is used to determine the present time. The present time may include the time of year (e.g., date) and/or the time of day (e.g., 6:00 a.m.). Like above, the locator 60 may be used to determine the present location of the device. The controller 52 of the electronic device 20 may then evaluate the subject record sets contained in memory 26 and identify those subjects that are likely to be proximate the present location at the present time. After identifying those subjects that are likely to be proximate the present location at the present time, the controller 52 may display the identified subjects on the visual display 22. The user may then select one of the identified subjects, and information regarding the selected subject may be displayed on the visual display 22.

Figure 8:
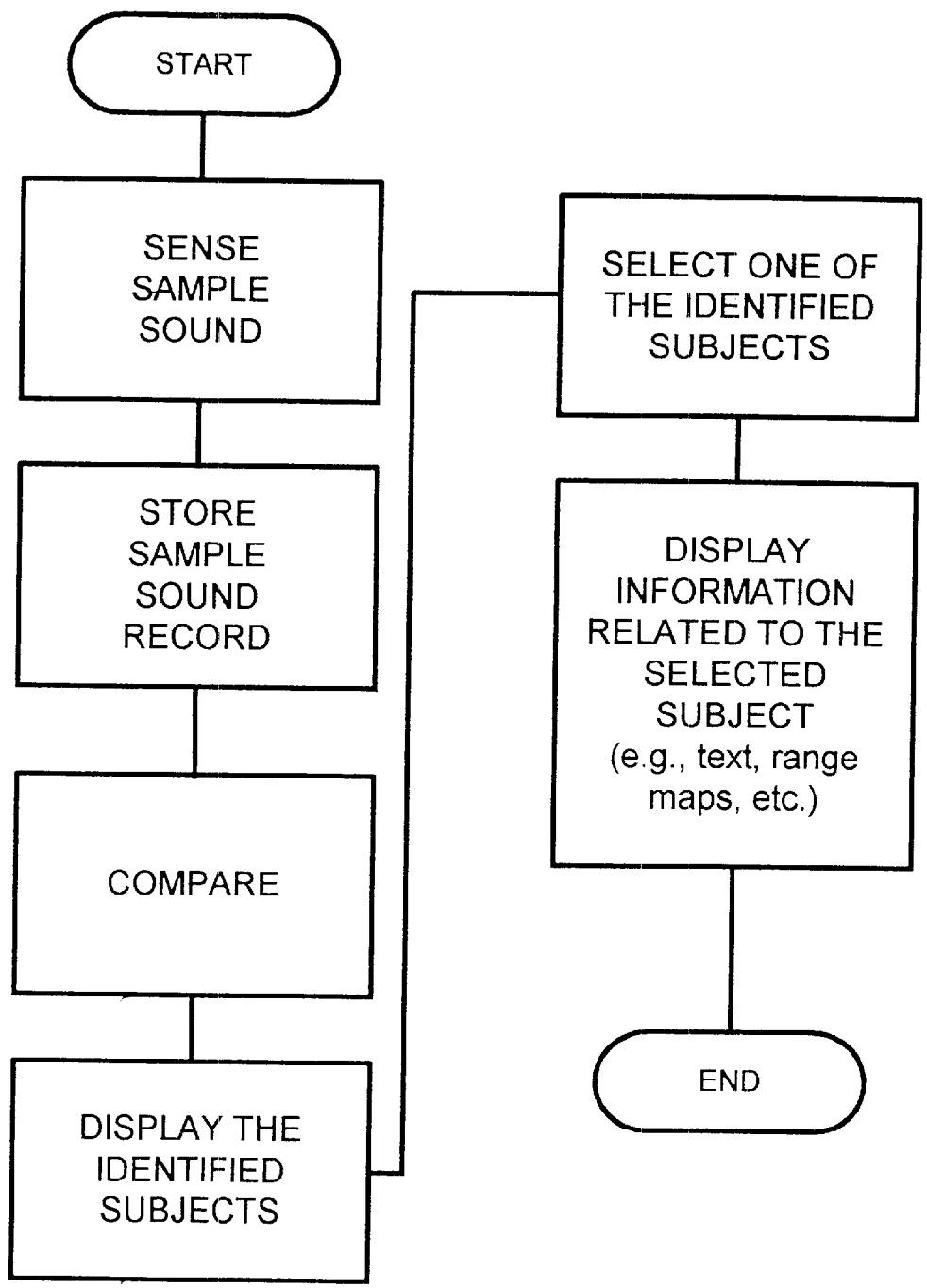
FIG. 8 is a flow chart showing another illustrative method for identifying a subject in accordance with the present invention.

FIG. 8 is a flow chart showing another illustrative method for identifying a subject in accordance with the present invention. A sample sound originating from one or more subjects to be identified is sensed using the sound sensor 54 of FIG. 4. This sample sound is digitized and stored in memory 26 as a sample sound record. In some applications, the sample sound may be processed in real time, and thus may not need to be stored in memory 26. In any event, the sample sound record is compared to the characteristic sound records 36 of the subject record sets in memory 26, and those subjects having a characteristic sound that is substantially similar to the sample sound are identified. The identified subjects are displayed on the visual display 22. If more than one subject is identified, the user may use the buttons 24 to select a displayed subject. Information related to the selected subject may then be displayed on the visual display 22.

Figure 9:
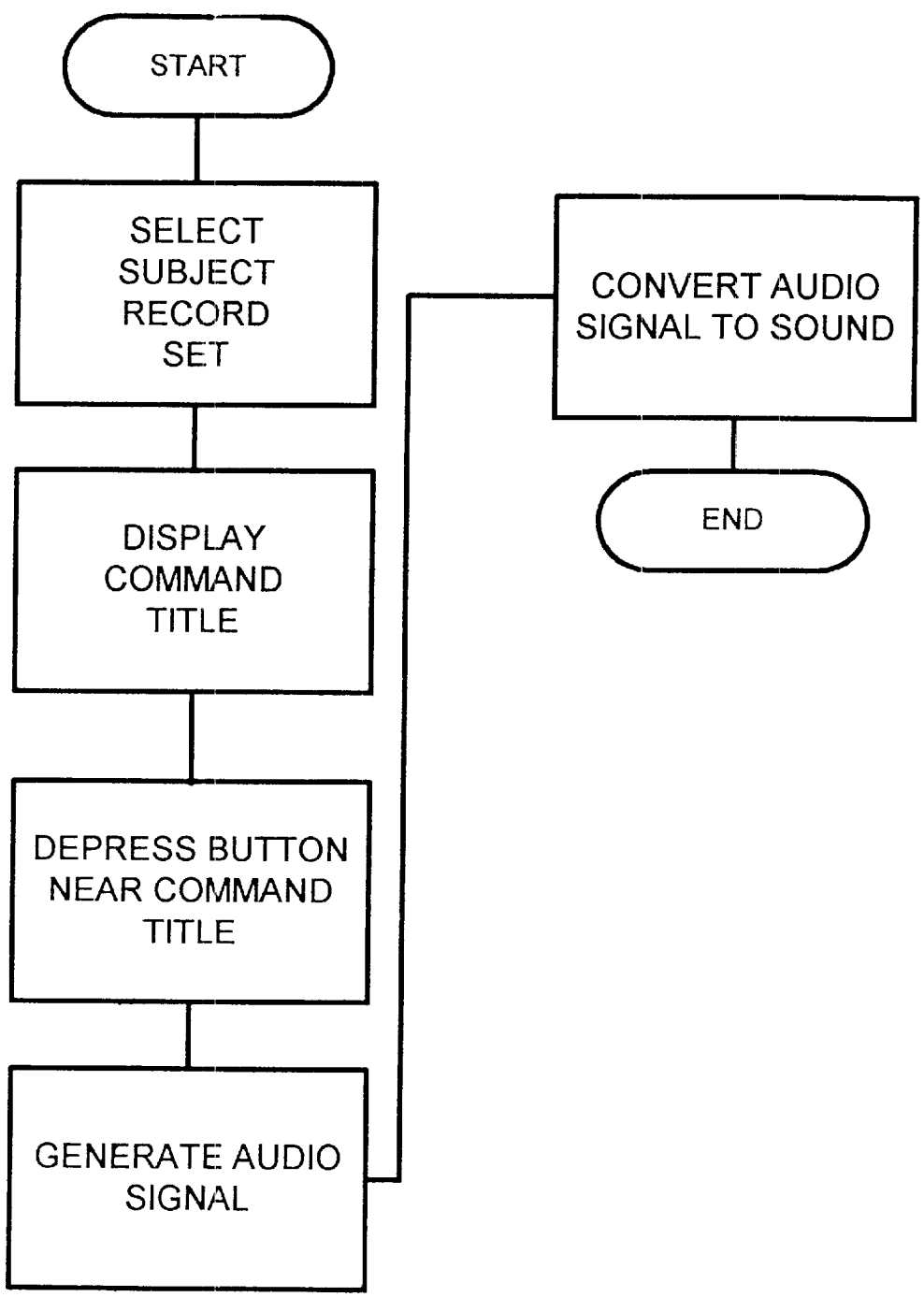
FIG. 9 is a flow chart showing an illustrative method of playing a sound in accordance with the present invention.

FIG. 9 is a flow chart showing an illustrative a method of playing a sound in accordance with the present invention. This method begins by identifying a subject. Once a desired subject has been identified, the user may select the subject record set for the identified subject, for example, by depressing one or more of the buttons 24. The controller 52 may then display information related to the selected subject on the visual display 22. The information displayed on the visual display 22 may include one or more command titles. For example, the word "SONG" may be displayed proximate one of the buttons 24 of the electronic device 20. The button proximate the desired command title may be depressed, and audio output circuit 48 of FIG. 4 may generate an audio signal that causes the speaker 50 to produce a sound corresponding to the sound record 36 of the subject record set corresponding to the selected subject. The user may confirm the identity of a subject by listening to the sound produced by the subject, and comparing it to the sound produced by electronic device 20. In some embodiments, a button may be designated for scrolling through all songs stored in the system.

Figure 10:
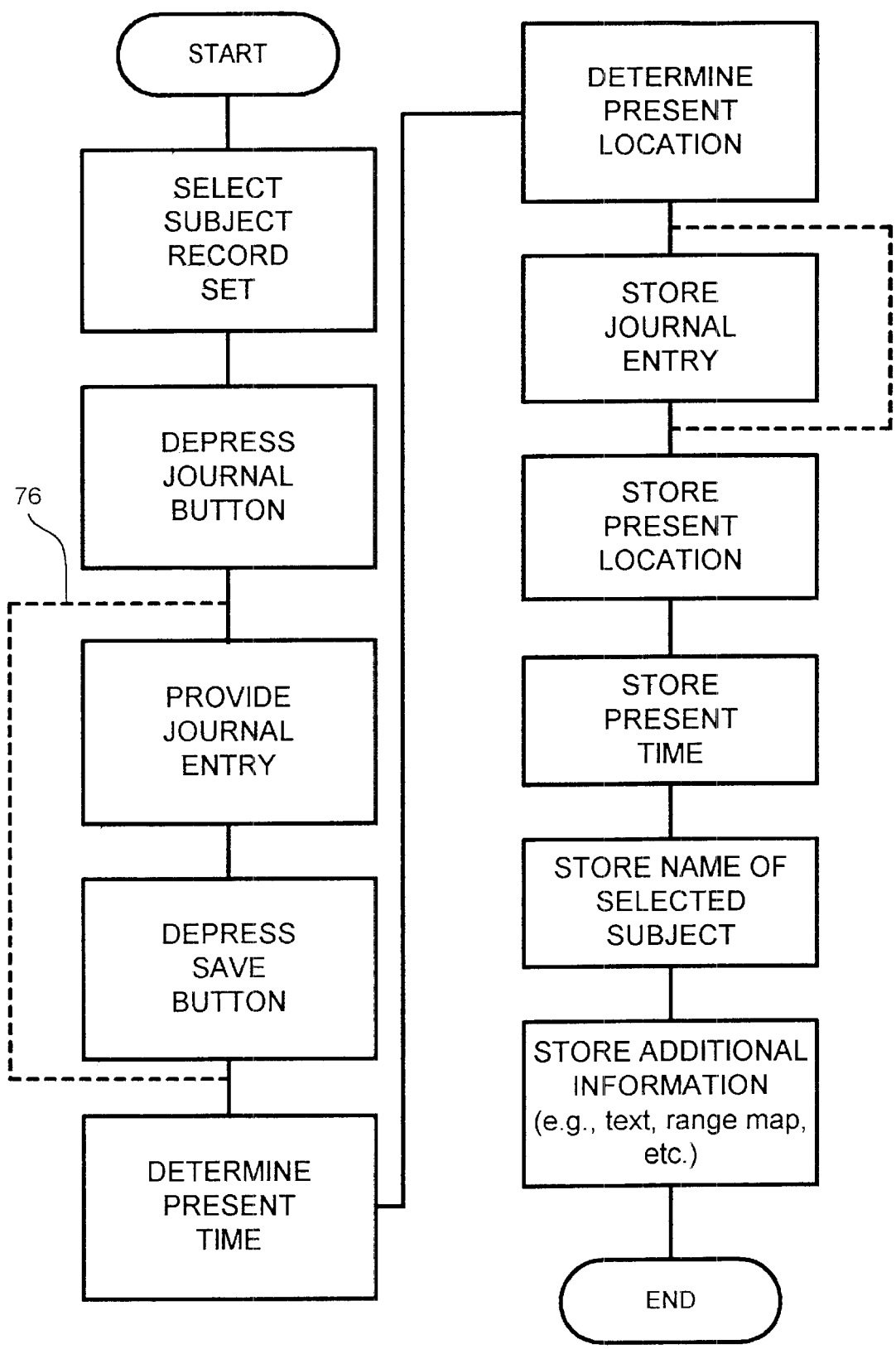
FIG. 10 is a flow chart showing an illustrative method of recording a journal entry in accordance with the present invention.

FIG. 10 is a flow chart showing an illustrative a method of recording a journal entry in accordance with the present invention. This method may be used, for example, after a user has identified a bird, and wishes to make a record of the event. Once a desired subject has been identified, the user may select the subject record set for the identified subject, for example, by depressing one or more buttons 24. The controller 52 may then display information related to the selected subject on the visual display 22. The information displayed on the visual display 22 may include one or more command titles. For example, the word "JOURNAL" may be displayed proximate one of the buttons 24 of the electronic device 20. The user may provide a journal entry to the electronic device 20 by, for example, depressing one or more keys 46. Then, a button 24 may be depressed, causing the electronic device 20 to electronically store the journal entry. The present location, the present time, and information relating to the identified subject (e.g., the subject name record) may also be stored with the journal entry if desired. As illustrate by a dashed line 76 in FIG. 10, a method in accordance with the present invention has been envisioned in which the user may create a journal entry that simply identifies the subject, along with the time and location of the sighting.

It is contemplated that multiple journal databases may be provided. This may allow multiple users of the device to store journal entries in separate databases. Also, a single user can setup multiple databases for storing journal entries for different times, locations, etc. Preferably, controller 52 allows the user to create and delete various journal databases, as desired.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A device for aiding a user in identifying a subject, comprising:

locator means for determining a present location of the device;

memory means for storing a plurality of subject record sets, each describing a subject;

each subject record set including at least one location parameter that indicate a likely location or range of locations for the corresponding subject; and identification means coupled to the locator means and the memory means for evaluating the subject record sets and identifying those subjects that are likely to be proximate the present location.

2. The device of claim 1, further including:

clock means coupled to the identification means for determining a present time;

each subject record set including at least one time parameter;

each time parameter being paired with a location parameter for describing a time when the subject is likely to be proximate the location described by the location parameter; and the identification means being adapted to evaluate the subject record sets and identify those subjects that are likely to be proximate the present location at the present time.

3. The device of claim 2, wherein the clock means for determining the present time is adapted to determine the present time of year.

4. The device of claim 2, wherein the clock means for determining the present time is adapted to determine the present time of day.

5. The device of claim 1, wherein the locator means comprises a global positioning system.

6. The device of claim 1, wherein the identification means comprises a microprocessor.

7. The device of claim 1, wherein each subject record set further includes a name record comprising text corresponding to a name of the subject described by the subject record set.

8. The device of claim 1, wherein each subject record set further includes an appearance record comprising digital data corresponding to a pictorial representation of the subject described by the subject record set.

9. The device of claim 1, wherein each subject record set further includes at least one sound record comprising digital data corresponding to a characteristic sound likely to be produced by the subject described by the subject record set.

10. The device of claim 9, wherein the characteristic sound is a birdsong.

11. The device of claim 9, further including a sound producing means for producing the characteristic sound corresponding to a sound record.

12. The device of claim 11, wherein the sound producing means includes a speaker.

13. The device of claim 11, wherein the sound producing means is activated by depressing a button.

14. The device of claim 1, wherein one or more subject record sets further include a plurality of sound records, each sound record comprising digital data corresponding to a different characteristic sound likely to be produced by the subject described by the subject record set.

15. The device of claim 1, further including a display means for displaying a listing of those subjects likely to be proximate the present location.

16. The device of claim 13, further including selection means for selecting one of the subjects in the displayed listing.

17. The device of claim 15, wherein the display means comprises a liquid crystal display.

18. The device of claim 1, further including a display means for displaying a pictorial representation of a subject.

19. The device of claim 18, wherein the display means comprises a color liquid crystal display.

20. The device of claim 1, further including a display means for displaying text and a pictorial representation related to a subject.

21. The device of claim 1, wherein each subject record set further includes a classification record.

22. The device of claim 21, wherein the classification record describes a genus associated with the subject.

23. The device of claim 21, wherein the classification record describes a species associated with the subject.

24. The device of claim 21, wherein the classification record describes a family associated with the subject.

25. The device of claim 1, wherein each subject record set further includes a classification record, and a name record comprising text corresponding to a name of the subject described by the subject record set.

26. The device of claim 25, further including:

a display means for displaying a listing of the classifications of the subjects likely to be proximate the present location;

selection means for selecting one of the displayed classifications; and wherein selection of one of the displayed classifications causes the display means to display the name record of the subject record set for each of the subjects that are members of the selected classification.

27. The device of claim 1, wherein each subject record set describes a living being.

28. The device of claim 27, wherein each subject record set describes a bird.

29. The device of claim 27, wherein each subject record set describes a person.

30. The device of claim 27, wherein each subject record set describes an insect.

31. The device of claim 27, wherein each subject record set describes a fish.

32. The device of claim 27, wherein each subject record set describes a mammal.

33. The device of claim 1, wherein each subject record set describes an object.

34. The device of claim 33, wherein each subject record set describes a vehicle.

35. The device of claim 33, wherein each subject record set describes a mineral.

36. The device of claim 33, wherein each subject record set describes a rock.

37. A method for aiding a user in identifying a subject, comprising the steps of:

determining a present location;

determining one or more subjects that are likely to be proximate the present location; and displaying information related to the identified subjects.

38. The method of claim 37, further comprising the steps of:

determining a present time; and determining one or more subjects that are likely to be proximate the present location at the present time.

39. The method of claim 37, further comprising the step of:

playing a sound recording of a characteristic sound likely produced by one or more subjects.

40. A device for identifying one of a number of subjects and/or for aiding a user in identifying one of a number of subjects, comprising:

a sound sensor for detecting a sample sound originating from one or more subjects of the number of subjects to be identified;

memory means for storing one or more characteristic sound records corresponding to characteristic sounds produced by the number of subjects;

identifying means for identifying one or more characteristic sound records that may corresponds to the sample sound; and means for providing information to the user regarding the one or more subjects that correspond to the one or more identified characteristic sound records.

41. The device of claim 40, wherein the memory means further stores a subject record set for each of the number of subjects, each of the subject record sets including information related to the corresponding subject.

42. The device of claim 41, further comprising display means for displaying at least some of the information in the subject record set that corresponds to the subject identified by the identification means.

43. The device of claim 40, wherein the memory means further stores the sample sound record detected by the sound sensor.

44. The device of claim 40, wherein the sound sensor comprises a microphone.

45. The device of claim 40, wherein the identifying means includes a microprocessor.

46. The device of claim 40, wherein the information provided to the user includes playing back one or more of the identified characteristic sound records through a sound producing means.

47. A device for electronically storing journal entries, comprising:

locator means for determining a present location of the device;

memory means for storing a plurality of journal entries;

user input means for entering a journal entry; and a controller coupled to the locator means, the memory means, and the data entry means for storing in the memory means a journal entry entered via the user input means along with the present location.

48. The device of claim 47, further including:

clock means coupled to the controller for determining a present time; and the controller being adapted to store the present time in the memory means along with the journal entry and the present location.

49. The device of claim 47, wherein the user input means comprises a keypad.

50. The device of claim 47, wherein the user input means comprises a touch sensitive display screen.

51. A method of electronically storing journal entries, comprising the steps of:

determining the present location;

providing a journal entry; and electronically storing the journal entry along with the present location.

52. The method of claim 51, further comprising the steps of:

determining a present time; and electronically storing the present time along with the journal entry and the present location.

53. The method of claim 51, wherein the journal entry is stored in an electronic device.

54. The method of claim 53, wherein the electronic device includes a key and the journal entry is electronically stored by depressing the key.

55. The method of claim 53, wherein the electronic device includes a touch sensitive display screen and the journal entry is electronically stored by depressing a portion of the touch sensitive display screen.

56. A method for aiding a user in identifying a bird, comprising the steps of:

displaying one or more categories of birds likely to be near the user;

selecting a category of birds;

displaying one or more birds of the selected category of birds;

selecting one of the displayed birds;

displaying a description of the selected bird; and allowing the user to play one or more songs characteristic of the selected bird.

57. A method for aiding a user in identifying a bird, comprising the steps of:

displaying one or more categories of birds;

selecting a category of birds;

displaying one or more birds of the selected category of birds;

selecting one of the displayed birds; and displaying information related to the selected bird.

58. A method according to claim 57 wherein the displaying step displays one or more categories of birds that are likely to be near the user.

59. A method for aiding a user in identifying a bird in a geographic region, the method comprising the steps of:

providing information related to a set of birds that are expected to be in the geographic region;

providing one or more menus to allow the user to select one of the birds from the set of birds; and displaying information related to the selected bird.

\* \* \* \* \*